United States Patent [19]

Battista et al.

[11] Patent Number: 4,460,808
[45] Date of Patent: Jul. 17, 1984

[54] ADAPTIVE SIGNAL RECEIVING METHOD AND APPARATUS

[75] Inventors: Ralph N. Battista, Colts Neck; Quentin D. Groves, Berkeley Heights; Jimmy Tow, Holmdel, all of N.J.

[73] Assignee: AT&T Bell Laboratories, Murray Hill, N.J.

[21] Appl. No.: 410,259

[22] Filed: Aug. 23, 1982

[51] Int. Cl.³ .............................................. H04M 1/50
[52] U.S. Cl. ................................ 179/84 VF; 307/356
[58] Field of Search ........ 179/84 VF, 18 DA, 18 EB; 340/825.48, 825.74, 825.73; 375/103, 102, 99, 76, 75; 307/358, 356

[56] References Cited

U.S. PATENT DOCUMENTS

| 3,076,059 | 1/1963 | Meacham et al. | 179/84 VF |
| 3,143,602 | 8/1964 | Morrison et al. | 179/84 VF |
| 4,162,377 | 7/1979 | Mearns | 179/18 D |
| 4,191,860 | 3/1980 | Weber | 179/18 B |
| 4,227,055 | 10/1980 | Hanson | 179/84 VF |
| 4,318,128 | 3/1982 | Sauvanet | 375/76 X |
| 4,385,208 | 5/1983 | Tow | 179/84 VF |

OTHER PUBLICATIONS

*Bell System Technical Journal*, vol. 39, No. 1, Jan. 1960, "Pushbutton Calling with a Two-Group Voice Frequency Code", pp. 235-255, L. Schenker.
*Bell Laboratories Record*, Jan. 1982, "Silencing Echoes on Satellite Circuits", pp. 3-6, L. E. Ashkenazi, T. H. Curtis, S. J. D'Ambra, R. H. Tegethoff.
*Bell System Technical Journal*, vol. 60, No. 7, Part 2, Sep. 1981, "Architecture and Performance", pp. 1449-1462, J. R. Boddie, G. T. Daryanani, I. I. Eldumiati, R. N. Gadenz, J. S. Thompson, S. M. Walters.
*Bell System Technical Journal*, vol. 60, No. 7, Part 2, Sep. 1981, "Receiver for Touch-Tone ® Service", pp. 1573-1583, J. R. Boddie, N. Sachs, J. Tow.

*Primary Examiner*—A. D. Pellinen
*Assistant Examiner*—James L. Dwyer
*Attorney, Agent, or Firm*—J. W. Herndon

[57] ABSTRACT

A tone receiver suitable for use in a telephone system and which adaptively narrows its amplitude sensitivity range defining valid tone signals on a per call basis in accordance with the amplitude of a first tone signal received on a call. The signal range adaptability improves signal echo rejection and spurious noise talkoff. A preferred embodiment is implemented by a programmed digital signal processor which increases the lower amplitude signal threshold in accordance with the amplitude of the first signal. An alternative embodiment adaptively attenuates the level of incoming signals before signal validation. A further improvement of both embodiments allows further amplitude range narrowing in response to any subsequent signal on a call which has an amplitude greater than that of any preceding signal in the call.

16 Claims, 7 Drawing Figures

ADAPTIVE SIGNAL RECEIVING METHOD AND APPARATUS

TECHNICAL FIELD

The invention pertains to signaling systems in general and, in particular, to improvements in telephone tone signal receivers to render the receivers more immune to echo and spurious signal talkoff.

BACKGROUND OF THE INVENTION

New telephone services are being introduced and planned in which dialing signals from telephone stations are transmitted long distances to control the processing of calls. New "800" service as described in U.S. Pat. No. 4,191,860, which issued to R. Weber on Mar. 4, 1980, and Auto Bill Calling as described in U.S. Pat. No. 4,162,377, which issued to A. Mearns on July 24, 1979, are examples of such services currently being introduced by the Bell System. At the present time, the signaling used to control such new services is the familiar dual-tone audible signaling generated from conventional pushbutton telephone stations.

One problem with tone signaling is the simulation of valid digit signals by other spurious audible signals such as noise and speech. One solution to this problem, discussed in the Bell System Technical Journal (BSTJ), Volume XXXIX, No. 1, January 1960, beginning at page 235, and in U.S. Pat. No. 3,076,059, which issued on Jan. 29, 1963, to Meacham et al, takes advantage of the fact that spurious signals usually contain significant frequency components other than valid signal frequencies produced by pushbutton stations. Input signals are passed through a limiter which produces a constant power output. The audible frequency components of a signal compete for part of the limiter power output. This creates a guardband effect in which the output signal power of a valid frequency component is reduced in the presence of signal power of other frequency components; output tuned circuits take advantage of the guardband by responding only to valid frequencies within a small margin of the total output power of the limiter.

U.S. Pat. No. 3,143,602, which issued to C. G. Morrison et al on Aug. 4, 1964, discloses an improvement of the above solution which employs a frequency dependent negative feedback signal to reduce the sensitivity of the limiter near valid frequency regions, thus further enhancing the guardband effect. Our invention further improves the immunity to spurious signal talkoff and, therefore, the valid signal response.

Another problem with signaling in the telephone network is echo. Reflections of digit signals caused by impedance mismatches in the network may appear as new digit signals to receivers and thereby cause dialing errors. Conventional dual-tone receivers are adequate to deal with echo problems generated on normal relatively short signaling routes. In one technique, this is accomplished by reducing the gain of a receiver for a short period of time, typically 20 milliseconds, after each valid digit signal recognition. This period is long enough to bridge echo response times on short signaling routes, but short enough so as not to bridge interdigital periods. The potential signaling distances involved in the offering of new services, such as discussed above, however, cause echo delays that are too great for this technique to work. Moreover, echo canceling chips (see Bell Laboratories Record, January 1982, pp. 3-6), which are used to eliminate speech echo on extremely long satellite circuits, do not solve the signaling echo problem because of the time required (approximately 200 ms) for the cancelers to correlate information to determine which signals are, in fact, echo signals.

SUMMARY OF THE INVENTION

The above problems are solved in a signal receiving method and apparatus in which a receiver is initially set to respond to signals having a parameter falling within a defined initial parameter range. In response to the detection of a first signal falling within the initial range, the range is adaptively narrowed for receiving subsequent signals based on the value of the parameter of the detected signal.

The method and apparatus may be used to detect audible dual-tone frequencies of the type generated by conventional pushbutton telephone stations, although the invention is not so limited. This type of signaling is discussed in the above-mentioned Bell System Technical Journal article. In this application, the adaptable parameter is signal amplitude.

In the preferred embodiment, the receiver is implemented by a microprocessor programmed to detect pulse-code-modulated (PCM) encoded dual-tone digit signals. At the beginning of a call before any digits are detected, the receiver is initialized to respond to valid digit signals falling within a wide amplitude range as in conventional dual-tone receivers. The broad range of sensitivity is required because of the large disparity in signal amplitudes received from different stations and on different signaling routes. The level of a first valid digit signal falling within the initial amplitude range is remembered. Succeeding digit signals pertaining to the same call are accepted as valid only if the correct frequencies are present and the signal levels are greater than an adaptive sensitivity threshold defined at a prescribed amount below the level of the first digit signal. The new sensitivity threshold level must be far enough below the level of the first signal to include all levels of digit signals that can reasonably be expected to occur on this one call from a given station and over a given connection, yet not low enough to allow the acceptance of echo signals. For perfect echo rejection, the receiver echo return loss over the connection should be equal to the maximum variation in tone signal levels that can reasonably be expected to occur on any given call. We have found that the levels of the components of dual-tone signals on a given call statistically do not vary from each other more than 9 db. Thus, 9 db below the level of the first digit signal is an appropriate sensitivity threshold.

In the preferred embodiment, if any succeeding digit signal has a level greater than any preceding signal, the adaptive sensitivity threshold is updated in accordance with the stronger signal. In other words, the sensitivity threshold is moved upward in response to any succeeding signal whose level exceeds that of any previously received digit signal on the call. This updating of the threshold level after the initial narrowing of the acceptable sensitivity range further improves the digit simulation and echo response, although it is not a necessary limitation to the invention.

In an alternative embodiment disclosed herein, a fixed lower level sensitivity threshold is selected such that echo signals statistically fall below the threshold and are rejected. An upper sensitivity threshold is selected by adding the maximum expected signal amplitude variation on a call. As mentioned above, this variation is approximately 9 db. A variable attenuator is inserted at the input of the receiver. At the beginning of a call, the attenuator is set to zero loss (unity gain). The level of the first digit signal on a call is measured. The amount of loss necessary to limit the amplitude of the first signal to the upper sensitivity threshold is calculated and the attenuator is controlled to insert this amount of loss. If the incoming signal level is lower than the upper sensitivity threshold, the gain of the attenuator is maintained at unity. Inserted loss is then controlled by the level of the second or any succeeding digit. In the preferred arrangement of this alternative embodiment, the inserted loss is increased in response to signals which are stronger than any prior signal received on the call. Thus, if each successive signal were stronger than the immediately preceding signal, each signal would cause an increase in the loss inserted.

DETAILED DESCRIPTION

Figure 1:
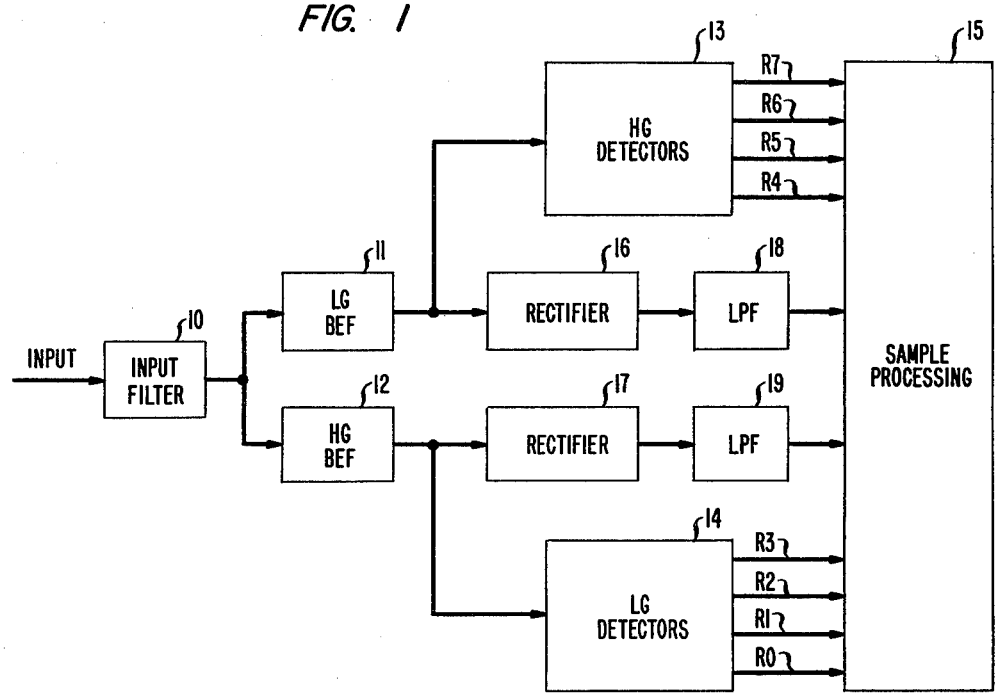
FIG. 1 shows a block diagram of a dual-tone telephone signal receiver including signal rectification functions for measuring signal levels and sample processing functions that incorporate the preferred embodiment of the invention.

FIG. 1 shows a block diagram of a receiver suitable for detecting dual-tone signals generated by conventional pushbutton telephones. Such signals are composed of one frequency component taken from a plurality of high group frequencies, and another frequency component taken from a plurality of low group frequencies.

With the exception of components 15 through 19, the receiver of FIG. 1 may be considered essentially identical to a receiver disclosed at pages 1573 to 1583 of the Bell System Technical Journal, September 1981, Volume 60, Number 7, Part 2. At the input is a filter 10, which reduces dial tone and powerline interference. The output of filter 10 feeds a low group (LG) band elimination filter (LGBEF) 11 and a high group (HG) band elimination filter (HGBEF) 12. The LGBEF provides loss only in the LG frequency band from 600 to 1050 hz. The HGBEF provides loss in the corresponding HG frequency pass band. The output of LGBEF 11 feeds a plurality of HG channel filters and detectors collectively shown here as 13 and revealed in more detail in FIG. 1 of the above Bell System Technical Journal article. Each associated bandpass filter and detector detects a specific one of the HG tones. Whenever an HG tone is detected, a constant level DC signal appears on an appropriate one of the output leads R4 through R7 of circuit 13.

In a similar manner, HGBEF 12 feeds a plurality of LG channel filters and detectors 14 which in turn produce a constant level DC signal on an appropriate output R0 through R3 whenever an LG tone is present.

Timing validation of signals R0 through R7 is performed by sample processor 15. In addition, processor 15 performs signal level validation as will be described in detail below. To derive signal level indications, the outputs of LGBEF 11 and HGBEF 12 are full wave rectified by rectifiers 16 and 17, respectively. Ripple in the outputs of rectifiers 16 and 17 is reduced by low pass filters 18 and 19, respectively, and the resulting DC signals are inputted to sample processor 15.

Figure 2:
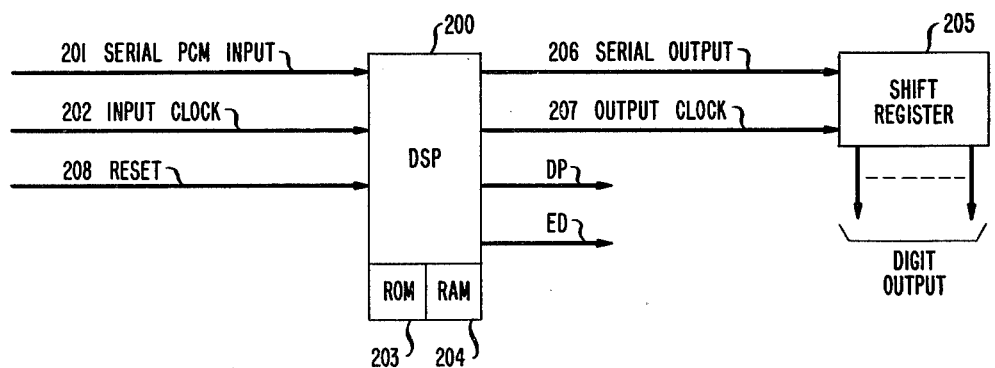
FIG. 2 shows a block diagram of a digital signal processor (DSP) and a shift register used to realize the preferred embodiment of the receiver of FIG. 1.

FIG. 2 shows a preferred microprocessor arrangement for realizing the receiver architecture of FIG. 1. Samples of signals to be processed by the receiver are first digitized into an 8-bit pulse-code-modulation (PCM) format. The bits of each sample are serially inputted into a digital signal processor (DSP) 200 on an input lead 201 under the control of clock signals on an input clock lead 202. DSP 200 is a microprocessor which can be programmed to perform a variety of digital signal processing functions, such as filtering and tone detection. DSP 200 is described in detail in the above-mentioned September 1981 Bell System Technical Journal beginning at page 1449. It includes a read only memory 203 in which a program is stored for controlling the arithmetic and logic operations of the DSP and a random access memory 204 used to store variable data during signal processing. As valid digit signals are detected, they are outputted to a shift register 205 on an output lead 206 under control of an output clock signal on lead 207. When the DSP is actively validating what appears to be a valid dual tone signal, a signal appears on an output lead ED (Early Detect). When validation is complete and the signal is determined to be a valid digit signal, the ED signal is replaced with a signal an output lead DP (Digit Present). The ED and DP signals are used by other utilization circuits (not shown) as appropriate. A signal on reset lead 208 prepares DSP 200 for a new operation.

Figure 3:
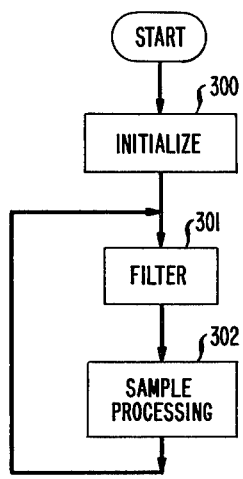
FIG. 3 shows a functional level flowchart of a program which controls the operation of the DSP of FIG. 2.

A functional flowchart of the DSP program is shown in FIG. 3. When the receiver is selected for call connection to receive dialed digits, the telephone office containing the receiver places a signal on the above-mentioned reset lead 208. This starts program execution at START in FIG. 3. An initialization routine 300 is first executed to initialize RAM 204 and DSP control registers. The main loop consisting of routines 301 and 302 is then repetitively executed until another signal appears on the reset lead 208.

Filter 301 performs the filtering, rectifying and tone detecting functions of the circuit shown in FIG. 1. The program waits for a sample to arrive on input lead 201. The sample is processed by filter 301 and the accumulated results are processed by the sample processing routine 302 to perform timing and signal level validation. This is the function of sample processing block 15 in FIG. 1. The program then returns to the beginning of the filter routine 301 and waits for the arrival of the next sample to be processed.

The filtering and tone detecting operations of filter 301 are discussed in the above-mentioned September 1981 Bell System Technical Journal article and are not discussed further herein. The rectifying operations to determine the amplitude levels of the individual LG and HG tone components are accomplished by taking the absolute value of samples and smoothing the results through a low-pass filter. These operations are well-known to those skilled in the state of the art and are also not discussed further herein.

The aggregate program execution time of routines 301 and 302 is designed to be less than the arrival rate of samples on input lead 201. Accordingly, the program of FIG. 3 is self-synchronizing with the arrival of the samples.

Figure 4:
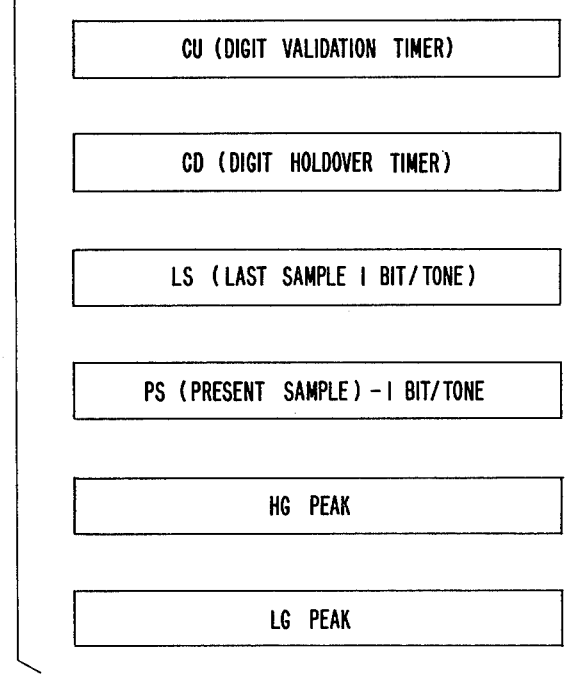
FIG. 4 shows a number of memory locations which are used by the program of FIG. 3.

A number of working registers used by the sample processing routine 302 are shown in FIG. 4. A validation timer CU is used to measure the length of time that a detected digit tone signal is present. A digit signal must be present for at least approximately 21 milliseconds in the illustrative embodiment to be considered a valid signal. A digit holdover timer CD is used to guarantee an illustrative timing of approximately 21 milliseconds after a valid signal vanishes before the validation of a new signal can begin. The initialization routine 300 in FIG. 3 sets CU to a full validation count and zeros CD at the beginning of a call. Thereafter, these timers are reinitialized and decremented at appropriate points in the sample processing routine 302. A last sample register LS is used to store the accumulated results after processing of the last sample. LS contains one bit for each of the LG and HG tone frequencies detected by the receiver. Present sample register PS stores the same information as LS after processing of a current sample. Finally, two registers HG PEAK and LG PEAK are used to store indications of the maximum level of the respective HG and LG tones received during a given call for the purpose of narrowing the signal level range for valid signals. The initialization routine 300 zeroes these registers at the beginning of a call to establish the initial signal level sensitivity of the receiver.

Figure 5:
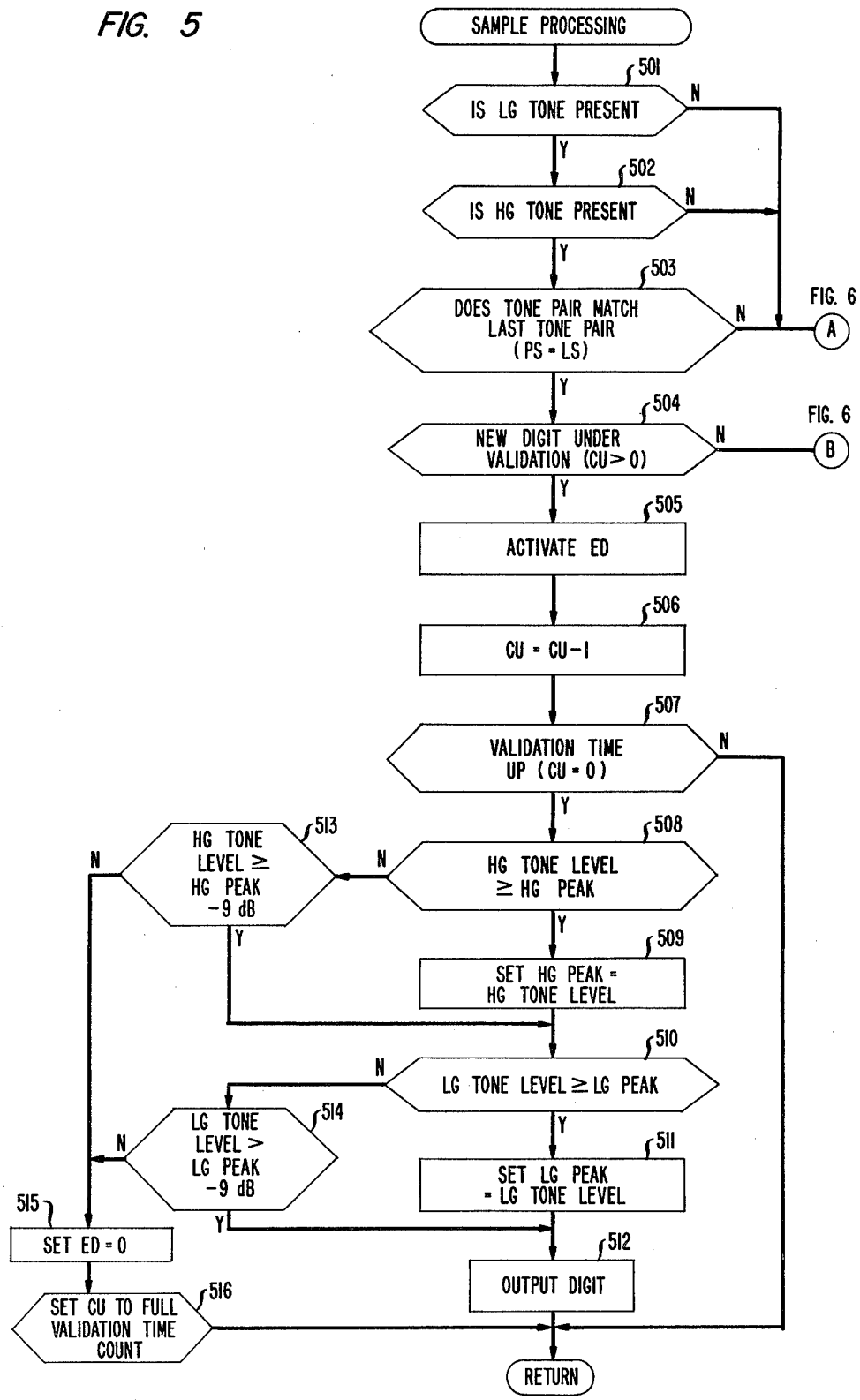
FIGS. 5 and 6 show detailed flowcharts of the sample processing functional step shown in FIG. 3.
Figure 6:
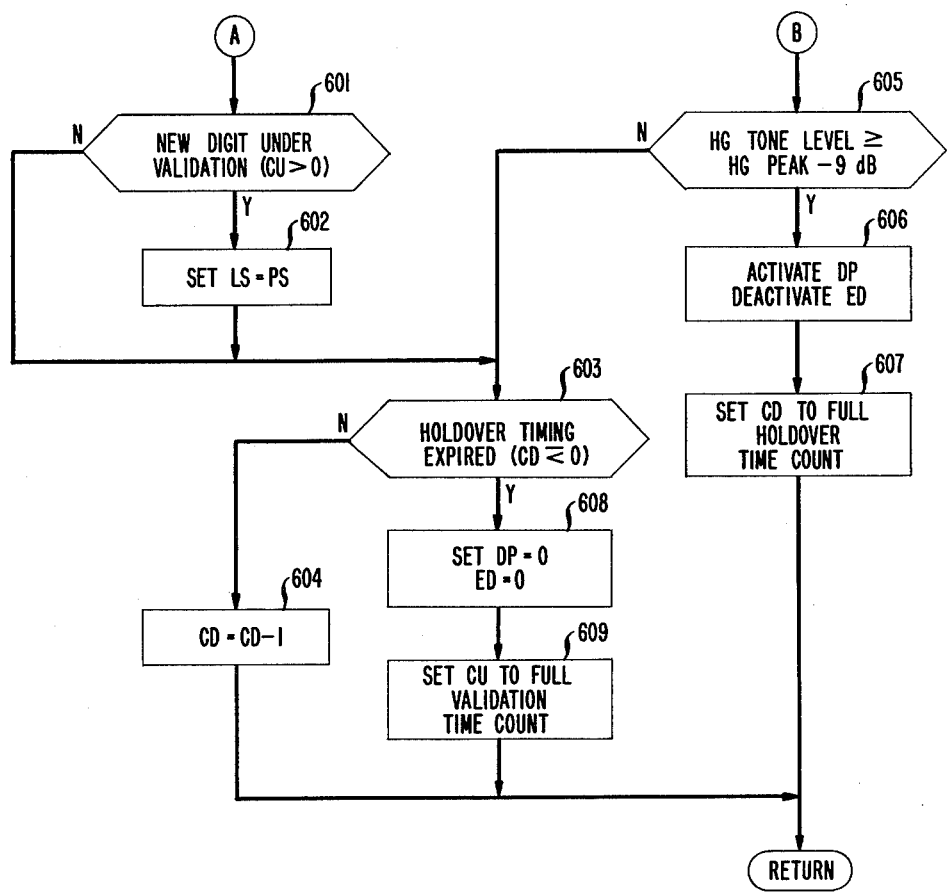

A detailed flowchart of the sample processing routine 302 is shown in FIGS. 5 and 6. This routine is entered after each sample has been processed by filter routine 301 in FIG. 3 and after the PS and LS registers have been updated. Assume now that the receiver has been reset by a signal on lead 208 and is in an initial state scanning for the beginning of an apparent digit signal. Validation timer CU is set to a count state representing approximately 21 milliseconds and holdover timer CD is set to zero. Registers LG PEAK and HG PEAK are set to zero to establish lower boundaries of the initial signal level ranges for each of the LG and HG tones. Each PCM encoded signal sample arrives on input lead 201 and is processed by the filtering algorithms of the DSP. After the filtering of each sample, the processing routine beginning on FIG. 5 is executed. Steps 501 and 502 of the processing routine test for the current presence of LG and HG tones. As long as no valid digit signal is present, one of the tests 501 and 502 will fail for each sample, causing the routine to execute step 601 in FIG. 6. Step 601 tests the count state of timer CU to determine if a digit signal has just been validated. As long as a CU is <0 (meaning that the receiver is awaiting the initial arrival of a new digit signal, or that a digit signal is currently being validated), the last sample register LS is updated to the contents of the present sample register PS. Since the hold over timer CD is zero (step 603), the digit present and early detect output leads DP and ED are maintained at zero at step 608 and the CU timer is maintained at a full validation count of approximately 21 milliseconds at step 609.

Assume now that a valid dual-tone signal is applied to the input of the receiver. A few samples must be processed by the filtering algorithm of the receiver before indications of both an LG and an HG tone become present. Eventually, a sample is processed after which the LG and HG indications are both present for the first time. When this occurs, step 503 is executed where the contents of the PS and LS registers are compared to determine if the current sample is the same as the last sample. This will not be true for the first sample in which both an LG and an HG tone appear. The routine, therefore, does not begin to validate the timing of the signal until the next sample arrives. When the next sample arrives, step 504 is executed. At step 504, validation timer CU is tested for a non-zero count state to determine if timing validation is in effect. Since CU is set to a full timing count at this time, step 505 is next executed where a signal is activated on the early detect lead ED. Next, the CU timing counter is decremented by one at step 506 and a determination made at step 507 if the validation time is now up (CU=0). Since the validation time has not expired, the sample processing routine returns to the main loop in FIG. 3 to await the next sample.

As long as each succeeding sample contains the same LG and HG tone components, the CU counter is decremented at step 507 until it equals 0, thus completing timing validation of the incoming signal. This takes approximately 21 milliseconds as has been mentioned. At this time step 508 is executed.

Step 508 begins the process of narrowing the acceptable signal amplitude range of the receiver. Step 508 determines if the HG signal level is greater than or equal to the level stored in the HG PEAK register. Recall that initially the HG PEAK register is set to 0. Therefore, step 509 is next executed where the HG PEAK register is set to the level of the HG tone just validated. This level is determined by rectifier 16 and low pass filter 18 in FIG. 1. Next, at step 510 it is determined if the level of the LG tone is greater than the level stored in the LG PEAK register. The LG PEAK register is also initially set to 0, causing the execution of step 511 where the LG PEAK register is set equal to the level of the LG tone from rectifier 17 and low pass filter 19 in FIG. 1. Since the digit signal has been validated at this time, a representation of the digit corresponding to the signal is outputted at step 512 on lead 206 to shift register 205 by the generation of an output clock signal on lead 207. The routine then exits to the main loop.

The next sample received will ordinarily contain the same LG and HG tones as the signal just validated for any valid digit situation. Since the CU timer is now equal to 0, the test at step 504 fails and causes the execution of step 605. Step 605 verifies that the digit signal is still present by determining if the HG tone level on this sample is equal to or greater than the new sensitivity level defined by the level stored in the HG PEAK register minus 9 db. Ideally, both the HG and LG tone levels should be tested at this point. Only the HG level is tested, however, in the interest of saving instruction memory space in this application. In the unlikely event that the HG signal level falls below the new sensitivity level at step 605, the routine will reinitialize the CU timer at step 609 to begin validation of a new digit. In this event, no digit is registered because lead DP has not been activated. In normal situations, however, step 606 is executed where the digit present lead DP is activated and the early detect lead ED is deactivated. At step 607, the holdover timer CD is set to a full holdover time count (approximately 21 milliseconds) and exit is made to the main loop.

While the digit signal remains, the holdover timer CD is updated at step 607 to a full count after each sample is processed. When the digit signal disappears, one of the tests 501, 502 or 503 fails and step 601 is executed. Since the CU timer is zero at this time, the routine bypasses the LS register update at step 602. Holdover timing is initiated at step 603 because the CD timer is greater than zero. At step 604, the CD timer is decremented by 1 and the main loop entered. Step 604 is executed on each sample thereafter until CD becomes zero (approximately 21 milliseconds). On the next sample to arrive after CD is decremented to zero, test 603 determines that holdover timing has expired and causes the DP and ED leads to be reset at step 608. CU is updated at step 609 to initialize the routine to look for the arrival of the next digit signal.

The samples for each succeeding digit are processed as described above. When the validation time expires on each of the succeeding digits, the levels of both the LG and HG tones are tested to determine if they pass the narrowed amplitude range. At step 509, HG PEAK is updated to the level of the HG tone on any succeeding digit signal if the HG tone level is greater than the level stored in HG PEAK. If the HG tone level is less than that in HG PEAK, the HG tone level is tested at step 513 to determine if it is not more than 9 db below the level in HG PEAK. Identical steps are performed with respect to the LG tone level at steps 510, 511 and 514. If either of the HG or LG tone levels fall below their respective sensitivity thresholds (HG PEAK-9 db) and (LG PEAK-9 db), the digit signal is rejected. In this case, the early detect lead ED is reset at step 515 and CU is set to a full validation count at step 516 to prepare the routine for the arrival of the next digit signal.

Figure 7:
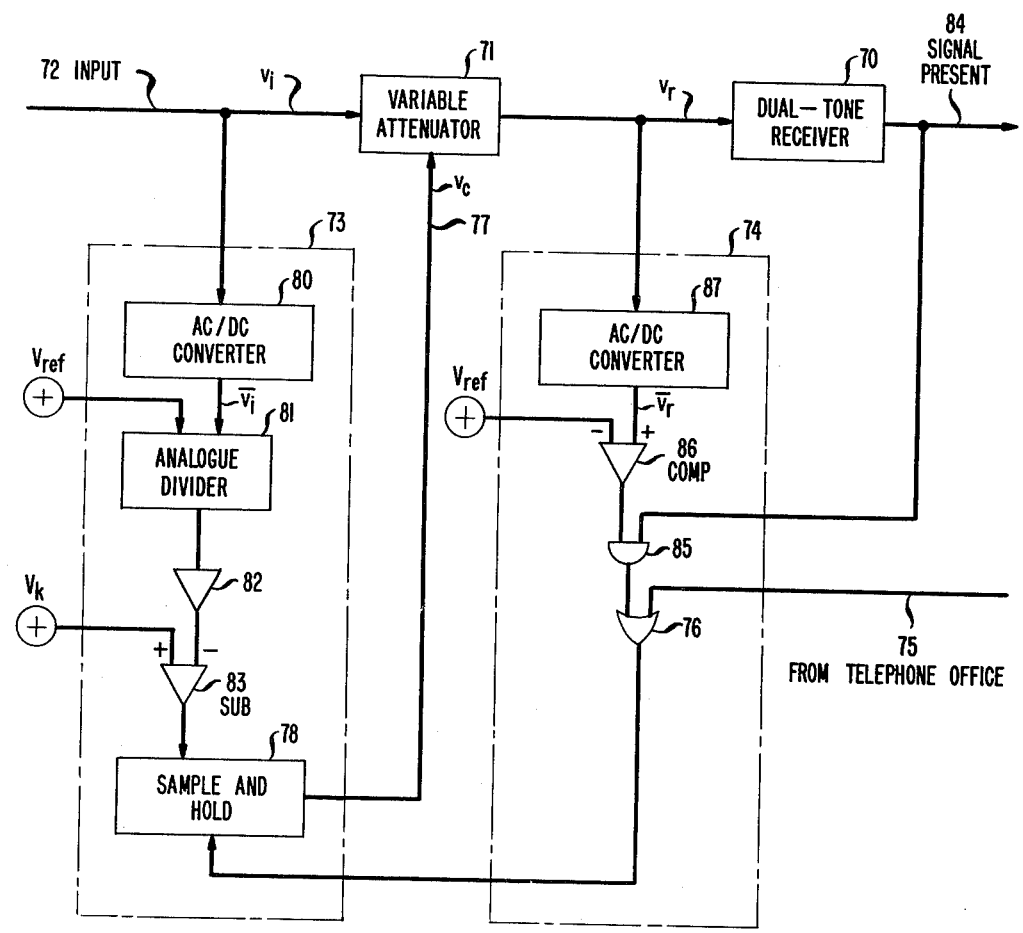
FIG. 7 shows an alternative embodiment of the invention in which signal levels are controlled by a variable attenuator placed ahead of a conventional receiver in a signal stream.

FIG. 7 shows a second embodiment of the invention which operates by adaptively attenuating the levels of incoming tone signals on a given call before the signals are inputted to a conventional receiver. The level of attenuation is controlled on a per call basis such that valid tone signals, although attenuated, are still recognized by the receiver, while the level of echo signals is reduced below the sensitivity threshold of the receiver. This second embodiment comprises a conventional dual-tone receiver 70 and a variable attenuator 71 which is inserted in the input signal path 72 ahead of the receiver. A control circuit 73 controls the level of inserted attenuation by circuit 71 in response to signals from a monitoring circuit 74, as will be described.

Receiver 70 is conventionally designed to respond to valid tones having levels residing anywhere within a broad range $v_{min}$ to $v_{max}$. For example, the above-mentioned Meacham et al patent teaches that its input limiter responds to signals in an illustrative range of 1 millivolt to 1 volt. At the beginning of a call, the circuitry of FIG. 7 is initialized such that attenuator 71 has a gain of unity thereby allowing full signal levels to be applied to the input of receiver 70. Incoming signal levels $v_i$ to attenuator 71 are monitored by circuit 73. Signal levels after attenuation are monitored by circuit 74. When a first valid tone signal is detected by receiver 70, circuit 74 controls circuit 73 to sample and hold the level $v_i$ of the signal. Circuit 73, in response, controls attenuator 71 to insert an amount of attenuation into the signal path that will reduce the level of the first signal to a level $v_r$ equal to a predefined reference level $V_{ref}$ above the minimum receiver threshold $v_{min}$ at the input to receiver 70. If the level $V_i$ of the first signal is less than or equal to $V_{ref}$, no attenuation is inserted. The inserted attenuation reduces the level of all succeeding signals. $V_{ref}$ is selected such that the reduced level of valid tone signals statistically should be greater than $v_{min}$ and thus be accepted by the receiver, whereas the reduced level of echo signals statistically should fall below $v_{min}$ and be rejected by the receiver. $V_{ref}$ is illustratively defined to be 9 db above $v_{min}$ in this embodiment.

The gain g of attenuator 71 must be equal to ($V_{ref}/v_i$) for $V_i > V_{ref}$ in order that $v_r$ at the input to receiver 70 be $V_{ref}$. In addition, attenuator 71 may be illustratively designed so that, for gain less than or equal to 1, the gain obeys the straight-line equation $$g = -\frac{v_c}{V_k} + 1$$

for $0 \leq v_c \leq V_k$ where $V_c$ is a control voltage from circuit 73 and $V_k$ is a constant voltage. The gain of attenuator 71 is thus unity when $v_c \leq 0$ and zero (infinite attenuation) when $v_c = V_k$. In accordance with the conditions given above, setting $$\frac{V_{ref}}{V_i} = -\frac{v_c}{V_k} + 1$$

shows that $$v_c = -\frac{(V_{ref})(V_k)}{v_i} + V_k$$

for $v_i > V_{ref}$, otherwise $v_c$ should be 0. To develop this control signal, converter 80 generates a DC voltage $v_i$ equal to the root-mean-square of signal $v_i$. Divider 81 divides reference voltage $V_{ref}$ by $v_i$. This result is multiplied by $V_k$ by amplifier 82 to generate the function $$\frac{(V_{ref})(V_k)}{v_i}.$$

This function is subtracted from $V_k$ by subtractor 83 and the resulting voltage is inputted to sample-and-hold circuit 78.

When a call is first recognized by the telephone office containing the circuitry of FIG. 7, the office momentarily applies a signal on lead 75 which is extended through OR gate 76 of monitoring circuit 74 to sample-and-hold circuit 78. This signal instructs circuit 73 to sample the level $v_i$ on input lead 72. The sample signal occurs before input lead 72 is cut-through to the call connection. Since there is not yet any tone signal present on the input lead, circuit 73 outputs a zero control voltage $v_c$ on lead 77 to initialize the attenuator 71 gain to unity.

When the first valid tone signal is detected by receiver 70, a signal is placed on SIGNAL PRESENT lead 84, which is extended to one input of AND gate 85 in circuit 74. The other input of gate 85 is connected to comparator 86 which, in turn, is connected to AC-to-DC converter 87. Converter 87 converts the AC level $v_r$ of the tone signal at the input of the receiver to an equivalent DC level $v_r$ which is compared to $V_{ref}$ by comparator 86. Comparator 86 generates an output signal if $v_r$ is greater than $V_{ref}$. This output signal completes the enabling of gate 85 which generates an output signal through OR gate 76 to sample-and-hold circuit 78. Circuit 78 samples the voltage from subtractor 83 and applies the resulting control voltage $v_c$ to lead 77. As a result, the proper level of attenuation is inserted ahead of receiver 70 by attenuator 71. Subsequently arriving echoes and valid tone signals are subjected to the attenuation.

Although the attenuation inserted on the first valid tone signal could be maintained for all subsequently arriving signals on this call, the invention is improved by further increasing the attenuation level if stronger signals are subsequently received. Thus, if the next valid tone signal received has a level greater than $V_{ref}$ after passing through attenuator 71, comparator 86 again generates an output signal which together with the signal on SIGNAL PRESENT lead 84 activates sample-and-hold circuit 78. This causes a new control voltage $v_c$ to be generated to further increase the attenuation level by an amount sufficient to reduce the stronger signal to $V_{ref}$ at the receiver input. However, if the level of any valid signal is less than $V_{ref}$ after attenuation, comparator 86 is not activated. The control signal $v_c$ and the resulting attenuation remain unchanged in this event.

In the above embodiment, attenuator 71 could easily be incorporated as part of the receiver 70. Assuming that the receiver is designed to detect dual-tone signals, a further improvement would result if a separate attenuator and associated control circuits were employed for each of the HG and LG tone components. In view of the above teaching, this modification is believed to be within the skill of an art worker and is not discussed further herein.

It is to be understood that the above-described arrangements are merely illustrative of the application of the principles of the invention, and that other arrangements may be devised by those skilled in the art without departing from the spirit and scope of the invention.

What is claimed is:

1. A method of adapting the amplitude sensitivity of a telephone system tone signal receiver to successive tone signals received from telephone stations on a per call basis, in which the receiver has an initial amplitude range for valid tone signals, said method BEING CHARACTERIZED BY the steps of
    ascertaining the amplitude of a first valid tone signal received during a call, and
    narrowing the initial amplitude range according to a prescribed algorithm based on the amplitude of the first valid tone signal for validating succeeding tone signals received during the call.

2. The invention of claim 1 in which the initial amplitude range has a prescribed lower amplitude threshold, wherein tone signals having amplitudes less than the lower amplitude threshold are rejected, and wherein the range narrowing step further comprises the step of
    increasing the lower amplitude threshold in accordance with the prescribed algorithm by an amount determined by the amplitude of the first valid tone signal.

3. The invention of claim 2 in which the range narrowing step further comprises the step of setting the lower amplitude threshold to a value equal to the difference between the amplitude of the first valid tone signal and a predefined value representing an expectation of the maximum range of variation of tone signal amplitudes on any given call.

4. The invention of claim 2 wherein the method further comprises the steps of
    comparing the amplitude of succeeding tone signals received during the call to the increased lower amplitude threshold, and
    rejecting any said succeeding tone signal whose amplitude is less than the increased lower threshold.

5. The invention of claim 4 wherein the method further comprises the step of
    further increasing the lower amplitude threshold according to the prescribed algorithm if the amplitude of any succeeding tone signal is greater than the amplitude of any preceding tone signal received on a call.

6. The invention of claim 2 further comprising the step of
    reestablishing the initial lower amplitude threshold before tone signal reception on each new call.

7. The invention of claim 1 wherein the range narrowing step further comprises the step of
    attenuating tone signals arriving after the first valid tone signal by an amount that would reduce the amplitude of the first tone signal to a predefined level, and
    verifying that the attenuated amplitudes of the subsequently arriving signals is within the initial amplitude range of the receiver.

8. The invention of claim 7 wherein the range narrowing step further comprises the step of
    increasing the attenuation of further incoming tone signals in response to a tone signal having an amplitude greater than any preceding tone signal received during the call.

9. The invention of claim 8 wherein the attenuation is increased by an amount sufficient to reduce the amplitude of the said greater amplitude tone signal to the predefined level.

10. A telephone system signal receiver comprising
    means for detecting tone signals of prescribed frequencies and having amplitudes falling within a prescribed initial amplitude range, and
    means responsive to the detection of a said tone signal during a telephone call for adaptively narrowing the amplitude range for the detection of succeeding said tone signals during the call according to a predetermined algorithm based on the value of the amplitude of the detected tone signal.

11. The invention of claim 10 wherein the range narrowing means further comprises variable signal attenuating means located ahead of the detecting means.

12. The invention of claim 10 wherein the range narrowing means further comprises
    means for detecting a succeeding said tone signal having an amplitude greater than the current threshold by a prescribed amount, and
    means responsive to the last-mentioned detecting means for updating the threshold based on the amplitude of the succeeding said signal to further narrow the acceptable amplitude range.

13. The invention of claim 12 wherein the signal receiver is a tone receiver and the tone receiver comprises means for detecting dual frequency signals.

14. The invention of claim 13 wherein the receiver further comprises
    independent range narrowing means for each frequency of the dual-frequency signals.

15. A telephone system tone receiver adaptable on a per telephone call basis for detecting tone signals transmitted over the telephone network, comprising means operative on each call for establishing an initial signal amplitude threshold below which incoming tone signals are rejected, means for measuring the amplitude of a first tone signal arriving during a call in which the amplitude is greater than the initial threshold, and means for establishing a new threshold for validating subsequently arriving tone signals during said call equal to the difference between the amplitude of the first tone signal and a predefined amount selected to be approximately the maximum amplitude variation of tone signals received on any given call.

16. A telephone system tone receiver adaptable on a per telephone call basis for detecting tone signals transmitted over the telephone network, comprising detection circuitry operative to reject tone signals having amplitudes below a prescribed threshold, variable amplitude attenuator means located ahead of the detection circuitry in the incoming tone signal path, means for measuring the amplitude of tone signals at the input to the attenuator means, and means for controlling the attenuator means to establish a first level of attenuation at the beginning of a call, including means connected to the amplitude measuring means and responsive to the detection of a first tone signal by the detection circuitry for controlling the attenuator means to increase the level of attenuation for subsequent tone signals on the call by an amount sufficient to reduce the amplitude of the first tone signal to a level above the threshold equal approximately to the statistical maximum variation in amplitude of all tone signals on any given call.

* * * * *